(12) United States Patent
Abraham et al.

(10) Patent No.: US 6,598,365 B2
(45) Date of Patent: Jul. 29, 2003

(54) IMPACT AND ENERGY ABSORBING PRODUCT FOR FLOORS, WALLS, AND OTHER FLAT SURFACES

(76) Inventors: Carl J. Abraham, 3 Baker Hill Rd., Great Neck, NY (US) 11023; Henry D. Cross, 546 Old Field Rd., Murrells Inlet, SC (US) 29576

( * ) Notice: Subject to any disclaimer, the term of this patent is extended or adjusted under 35 U.S.C. 154(b) by 140 days.

(21) Appl. No.: 09/975,817

(22) Filed: Oct. 12, 2001

(65) Prior Publication Data

US 2003/0070376 A1 Apr. 17, 2003

(51) Int. Cl.[7] .............................................. E04F 15/22
(52) U.S. Cl. .................... 52/403.1; 52/167.1; 52/167.4; 267/160; 267/179; 482/23; 482/26; 482/30
(58) Field of Search ............................. 52/403.1, 167.1, 52/167.4, 169.7; 482/121, 23, 26, 14, 30, 32, 25, 148; 29/265; 267/160, 179, 170

(56) References Cited

U.S. PATENT DOCUMENTS

| | | | |
|---|---|---|---|
| 3,942,198 A | 3/1976 | Jewett | 4/172 |
| 3,956,779 A | 5/1976 | Jewett | 4/172 |
| 4,274,626 A | 6/1981 | Grosser | 272/109 |
| 4,819,932 A | 4/1989 | Trotter | 272/3 |
| 4,883,267 A | 11/1989 | Burley | 272/3 |
| 5,398,351 A | 3/1995 | Watson | 4/506 |
| 5,915,819 A | 6/1999 | Gooding | 36/29 |
| 6,004,217 A | 12/1999 | Johnston | 472/92 |
| 6,199,942 B1 | 3/2001 | Carroll | 296/189 |

Primary Examiner—Carl D. Friedman
Assistant Examiner—Chi Q Nguyen

(57) ABSTRACT

An impact and energy absorbing product for floors, walls, panels, crash mats and other flat surfaces. More particularly, the invention teaches the usage of coiled springs in conjunction with polymeric materials or metals such as titanium or steel, to help absorb and dissipate forces of humans and other objects coming in contact with said flat surfaces. Depending upon the exact environment in which the same are to be used, the coiled springs may be constructed of polymers or metals such as titanium or steel—lightweight, yet durable materials to accomplish the purposes of the invention. In the preferred mode of attachment, an insert is fitted to each end of each spring, with a flared insert then placed into a molded female slot upon a flat surface to hold the spring in place. Thus, a floor or wall surface may comprise a series of female slots such that multiple springs can easily slide therein. The springs may be spread throughout the area to be protected, providing a completely controlled protected area to help effectively absorb and dissipate forces upon impact. As such, the assembly of the present invention may be utilized for items such as crash mats for many sports, wall mats in gymnasiums, or wall boards in indoor or outdoor rinks and arenas.

19 Claims, 4 Drawing Sheets

IMPACT AND ENERGY ABSORBING PRODUCT FOR FLOORS, WALLS, AND OTHER FLAT SURFACES

BACKGROUND OF THE INVENTION

1. Field of the Invention

The present invention is an impact and energy absorbing product for floors, walls, panels, crash mats, and other flat surfaces. More particularly, the invention teaches the usage of coiled springs in conjunction with polymeric materials or metals such as titanium or steel, to assist in the absorption and dissipation of forces from humans and other objects coming in contact with said floors, walls, panels, and other flat surfaces.

2. Description of the Prior Art

Numerous innovations for improved floor and board designs have been provided in the prior art that are described as follows. Even though these innovations may be suitable for the specific individual purposes to which they address, they differ from the present invention as hereinafter contrasted. The following is a summary of those prior art patents most relevant to the invention at hand, as well a description outlining the differences between the features of the present invention and those of the prior art.

1. U.S. Pat. No. 3,956,779, invented by Jewett, entitled "Tippable Sunken Baffles For Diver Protection In Pools"

In the patent to Jewett, novel baffles are provided for safeguarding divers from severe head, neck or back injuries due to unexpected collisions with bottom walls of pools, and operate on the principle of "rolling with the punches" rather than taking them head-on, with the buoyant force of the layer of pool water immediately underlying the frontward platform-like impact-receiving portion of the baffle serving to cushion the downward or downward-frontward tipping movement which results from collision therewith of the body of a descending diver and aid in returning said platform-like portion to its initial position; whereby difficulties with excessive rebound or whiplash action of the baffle are obviated. In step-wise series or cascades, two or more may act sequentially and independently, so that rebound force generated by one comes too late to affect the diver, his body meanwhile having passed out of range of such rebound force and into cushioned contact with the next. Special further arrangements of the new baffles are also disclosed for protecting the heads of slide-divers doing unexpected somersaults, as well as for permitting divers to intentionally convert their divers into partial or full dive rolls to be terminable on cushioned slideways sloping from the water level immediately in front of the slide and in a downwardly-forwardly manner, without incurring risk of paraplegic injury in the process.

2. U.S. Pat. No. 3,942,198, invented by Jewett, entitled "Safety Baffling And Related Equipment For Swimming Pools"

The Jewett patent provides novel safety baffling or baffles for placement in swimming pools at loci underlying the forwardly protruding fronts of poolside slides, diving boards, and diving platforms, and extending any desired distance rearwardly of said fronts as well as forwardly thereof at least a typical diver-body length of 3 to 5 feet but advantageously more. Advantageously each baffle comprises a relatively dense and slippery skid-surfaced lamina carrying "streamlined" slippery-surfaced, cushioning "shingles" plus a less dense subjacent cushioning medium or lamina, e.g., of polyurethane foam or the equivalent, so placed as to obliquely, i.e. glancingly, intercept the trajectory of a headfirst slider or diver sufficiently to at once control or change its direction and reduce his momentum—this process being successively repeated via new such interceptions engendered by change in angularity of said skid surface or of obliquity of downwardly dangling arms of a slide diver along it when it is comprised in a buoyantly floating said baffle; in which latter case characteristic danger of a neck-breaking somersault will be precluded.

3. U.S. Pat. No. 5,398,351, invented by Watson, entitled "Above-Ground Pool Underlayment Panels"

In the patent to Watson, a group of modular planar structural foam sections are laid on the ground directly underneath the liner of an above-ground pool. The foam panels are cut so that they fit tightly side-by-side covering all areas within the frame. The joints between the panels are then filled by caulking and taped over to smooth the top surface of the joints. The result is an improved pool underlayment system which provides many advantages, including cushioning of swimmer impact to help prevent shallow diving injuries.

4. U.S. Pat. No. 4,274,626, invented by Grosser et al., entitled "Exercise Floor"

In the patent to Grosser, et al., 4×8 Plywood sections are interconnected by a system of tabs and latches, and a spring suspension system is provided beneath the interconnected sections.

5. U.S. Pat. No. 4,819,932, invented by Trotter, Jr., entitled "Aerobic Exercise Floor System"

The Trotter, Jr. patent describes a resilient wood floor for aerobic exercise. The boards of the floor are free to pivot in tongue and groove joints. The wood is laid on a foam pad which will always yield during ordinary human exercises. The boards are held together by spring clips which lengthen when a load is applied to the boards, while holding the boards close together in a manner to prevent pinching.

6. U.S. Pat. No. 5,915,819, invented by Gooding, entitled "Adaptive, Energy Absorbing Structure"

The patent to Gooding describes an adaptive, energy absorbing body which includes a plurality of fluid filled cells joined together by fluid flow passageways so as to establish an intercommunicating structure which provides effective cushioning. The cells also include pressure responsive seals which restrict fluid flow between the cells when the cells are subjected to a mechanical force above a pre-selected level. Closure of the seals converts the material from open cell, to a closed cell structure, allowing it to absorb and dissipate high levels of kinetic energy. The structure is particularly useful as a shock absorbing element for footwear.

7. U.S. Pat. No. 4,883,267, invented by Burley, entitled "Dasher Board System"

In the patent to Burley, an ice rink dasher board system having an adjustable shock absorbing mechanism for providing a desired degree of resiliency of the dasher board panels is disclosed. The dasher board system may also have a rink seal gasket located between the dasher board frame and the dasher board panels, the gasket extending beneath the system to permit installation of the system even on uneven surfaces. The dasher board system may also include a door having a push-button latch that can be actuated from either side of the door.

8. U.S. Pat. No. 6,199,942, invented by Carol, III et al., entitled "Modular Energy Absorbing Assembly"

The patent to Carol, III et al. describes an energy absorbing assembly is provided for decelerating an object that impacts the assembly. The assembly comprises at least one energy absorbing member for accommodating deformation of the assembly. The assembly comprises a base and at least energy absorbing module associated therewith. The at least one energy absorbing module is formed from a group consisting of structure "A" and structure "B". Structure "A" is a metal lattice which supported by the thermoformed base. Structure "B" comprises of plurality of recesses, each having a floor and a wall. Together, structures "A" and "B" and combinations thereof afford a user-determinable resistance to impact.

9. U.S. Pat. No. 6,004,217, invented by Johnston et al., entitled "Flexible Dasher Board System"

The patent to Johnston describes a flexible dasher board assembly that utilizes four aspects for providing shock absorbing features to absorb any of four types of forces imparted thereon by players. In a first aspect, the entire dasher board assembly is provided with rotational flexibility such that the board assembly will pivot about a point near the bottom of the dasher board and close to the ice. In a second aspect, the entire dasher board system is provided with translational flexibility, such that the board assembly can be pushed substantially parallel with and away from the ice. In a third aspect, only the shielding panel is provided with rotational flexibility such that the shielding panel will pivot about a point within the dasher board. In a fourth aspect, only the shielding panel is provided with translational flexibility such that only the shielding panel can be pushed substantially parallel with and away from the ice.

The aforementioned prior art patents illustrate various designs intended to provide safety and protection for floors and flat surfaces. For example, the patents to Jewitt illustrate cushions or "baffles" for the bottoms of pools to safeguard divers from head, neck, or back injuries. However, Jewitt inventions fail to teach the usage of polymeric or titanium springs for such cushioning.

Other protective floor designs for sporting activities include: panels of foam padding that are affixed to one another by spring clips; energy absorbing panels that are filled with fluid for cushioning purposes; and various impact-absorbing designs for hockey dasher boards or skating rink boards.

In contrast to the above, the present invention teaches the usage of coiled springs in conjunction with polymeric materials or metals such as titanium or steel, to help absorb and dissipate forces coming in contact with outer panels of the flat surfaces. An insert is fitted to each end of the spring, with a flared insert placed into a molded female slot (located upon the flat surface) to secure the spring. Such springs may be spread throughout a panel, crash mat or board, as desired, and the stiffness of the springs may be tailored according to the type of activity in which the invention is utilized. An outer panel covers the springs, and forms the outermost exposed surface to receive the forces of humans and objects.

In one embodiment, the assembly is applied to bottom surfaces of in-ground or above-ground pools to prevent common diving injuries. Secured by suction cups, this unique design is water resistant to provide a long-term solution for residential and professional pools. Importantly, water can freely pass through the assembly, functioning to keep the assembly in its secure and fixed position. The swimming pool-related embodiment may be easily retrofitted to previously existing in-ground or above-ground pools, and greatly mitigates the potential of spinal and paraplegic-type injuries resulting from diving. Thus, the invention mitigates the incidence and severity of injury in many sporting activities, in a cost-effective and convenient manner.

SUMMARY OF THE INVENTION

As noted, the present invention is an impact and energy absorbing product for floors, walls, panels, crash mats, and other flat surfaces. More particularly, the invention teaches the usage of coiled springs in conjunction with polymeric materials or metals such as steel or titanium, to help absorb and dissipate forces of humans and other objects coming in contact with outer panels of said flat surfaces.

Depending upon the exact environment in which the same are to be used, the coiled springs may be constructed of polymers or metals including titanium and steel—lightweight, yet durable materials to accomplish the purposes of the invention. In the preferred mode of attachment, an insert is fitted to each end of each spring, with a flared insert then placed into a molded female slot upon a flat surface to hold the spring in place. Thus, a floor, crash mat or wall surface may comprise a series of female slots such that multiple springs can easily slide therein. The springs may be spread throughout the area to be protected, providing a completely controlled protected area to effectively absorb and dissipate forces upon impact. Because an outermost panel covers the springs and forms the surface that is contacted by humans and objects, less board or wall material is required in manufacturing the item, thus reducing both the cost and weight significantly. As such, the assembly of the present invention may be utilized for items such as crash mats for many sports, wall mats in gymnasiums, or wall boards in indoor or outdoor rinks and arenas.

In one particular embodiment, the assembly of the present invention is applied to bottom surfaces of in-ground or above-ground pools, to greatly mitigate the incidence of concussion and other injuries associated with diving. Such may readily retrofitted to all previously-existing pools. Importantly, the assembly may be affixed to the bottom of the pool via suction cups, and may also allow water to pass through its principal components. Specifically, such maybe applied to riser portions of the pool floor, as these angled surfaces are often adjacent a diving board, which leads to countless spinal injuries, concussions, and other severe injuries. In any such embodiment, the stiffness of the springs of the invention may be tailored to an appropriate degree according to the type of activity in which the invention is utilized. Thus, in total, the present invention lessens the incidence and severity of injury in a great variety of sporting activities, at low costs and with ease of manufacture and installation.

Depending upon the exact environment in which the same are to be used, the coiled springs may be constructed of polymers or metals such as titanium or steel—lightweight, yet durable materials to accomplish the purposes of the invention. In the preferred mode of attachment, an insert is fitted to each end of each spring, with a flared insert then placed into a molded female slot upon the flat surface to hold the spring in place. Thus, a flat surface such as a floor, board, crash mat or wall may comprise a series of female slots such that multiple springs can easily slide therein. The springs may be spread throughout the area to be protected, providing a completely controlled protected area to effectively help absorb and dissipate forces upon a user's impact to the assembly's outermost panel.

Importantly, the stiffness of the springs of the invention may be tailored to an appropriate degree according to the type of activity in which the invention is utilized. In total, the present invention lessens the incidence and severity of injury in a great variety of sporting activities, at low costs and with ease of manufacture and installation.

To illustrate the need for the present invention, the following description relates to the incidence and severity of concussions commonly occurring in sporting activities:

About 300,000 sports-related concussions occur each year, and approximately 900 sports-related traumatic brain-injury deaths occur each year. The risk of concussion is approximately 4 to 6 times higher in persons who have experienced previous concussions. A significant number of head injuries occur during activities such as roller blading, roller skating and roller hockey, scooters, motorcycling, and boxing are included.

A concussion is a change in mental status caused by a blow to the head. Symptoms include confusion, amnesia, nausea, dizziness, blurred vision, and loss of consciousness. Such is due to the fact that at the moment of injury, the brain becomes chemically imbalanced. The list of athletes who have sustained career-ending concussions spans every major sport and activity. Although football and hockey are widely considered the most inherently dangerous, no sporting activity is completely safe.

Furthermore, younger athletes are at considerable risk as well. Although the level of play and corresponding collisions are less than those in adult sports, younger players are far less adept at protecting themselves, leading to multiple sever injuries. For the purposes of example, 46% of injuries among children and adolescents in the sport of ice hockey relate to head injuries in particular. Collisions with previously existing boards and walls of rinks and arenas contribute to such statistics, frequently causing concussions and other severe injuries to many players. Importantly, such injuries are often spinal injuries which result in paraplegic conditions.

Based upon all of the foregoing, a need exists for additional protection that will mitigate the incidence of spinal injury, head trauma and concussion of persons colliding with hard bottom surfaces of pools, as well as with other boards, crash mats and walls common in sporting arenas. So as to render the same available to the most applications possible, a need exists for such an apparatus to be manufactured at a relatively low cost and retrofitted to a vast quantity of previously-existing items.

As noted above, then, the present invention is an improved protective device which relies upon a unique coiled spring assembly. More particularly, the present invention is an improved protective device for floor surfaces, boards in sporting arenas, and other walls in dangerous areas, wherein significant additional cushioning is provided in a manner previously unattained in the prior art.

It is therefore the primary objective of the present invention to mitigate the incidence of spinal injuries, concussions and other severe injury to divers, swimmers, and a host of other athletes.

It is also an object of the present invention to provide an impact and energy absorbing assembly that is relatively inexpensive to manufacture.

It is also an object of the present invention to provide an impact and energy absorbing assembly that requires less board or wall material to be used, thus reducing the costs and weight of the item in question.

It is a further object to provide a coiled spring assembly that may be easily retrofitted to previously-existing floor surfaces, walls, crash mats and boards, providing the benefits of the present invention to a great variety of applications.

In addition, it is an object of the present invention to provide a coiled spring assembly that may alternatively be manufactured on new flat surfaces during initial construction of items such as in-ground pools.

It is a further aim of the invention to provide a coiled spring assembly that conveniently attaches to previously existing floors and boards without expensive modification thereto.

It is a further object of the invention to provide a coiled spring assembly that is manufactured in a variety of previously determined sizes, so as to render the same effective for a host of sporting activities and additional applications where such protection is desired.

Finally, it is an object of the invention to provide a coiled spring assembly that is manufactured in a variety of previously determined colors and designs, so as to match the décor of the surface upon which the same are utilized.

The novel features which are considered characteristic for the invention are set forth in the appended claims. The invention itself, however, both as to its construction and its method of operation, together with additional objects and advantages thereof, will be best understood from the following description of the embodiments when read and understood in connection with accompanying drawings.

BRIEF DESCRIPTION OF PREFERRED EMBODIMENTS

DETAILED DESCRIPTION OF THE PREFERRED EMBODIMENT

Figure 1:
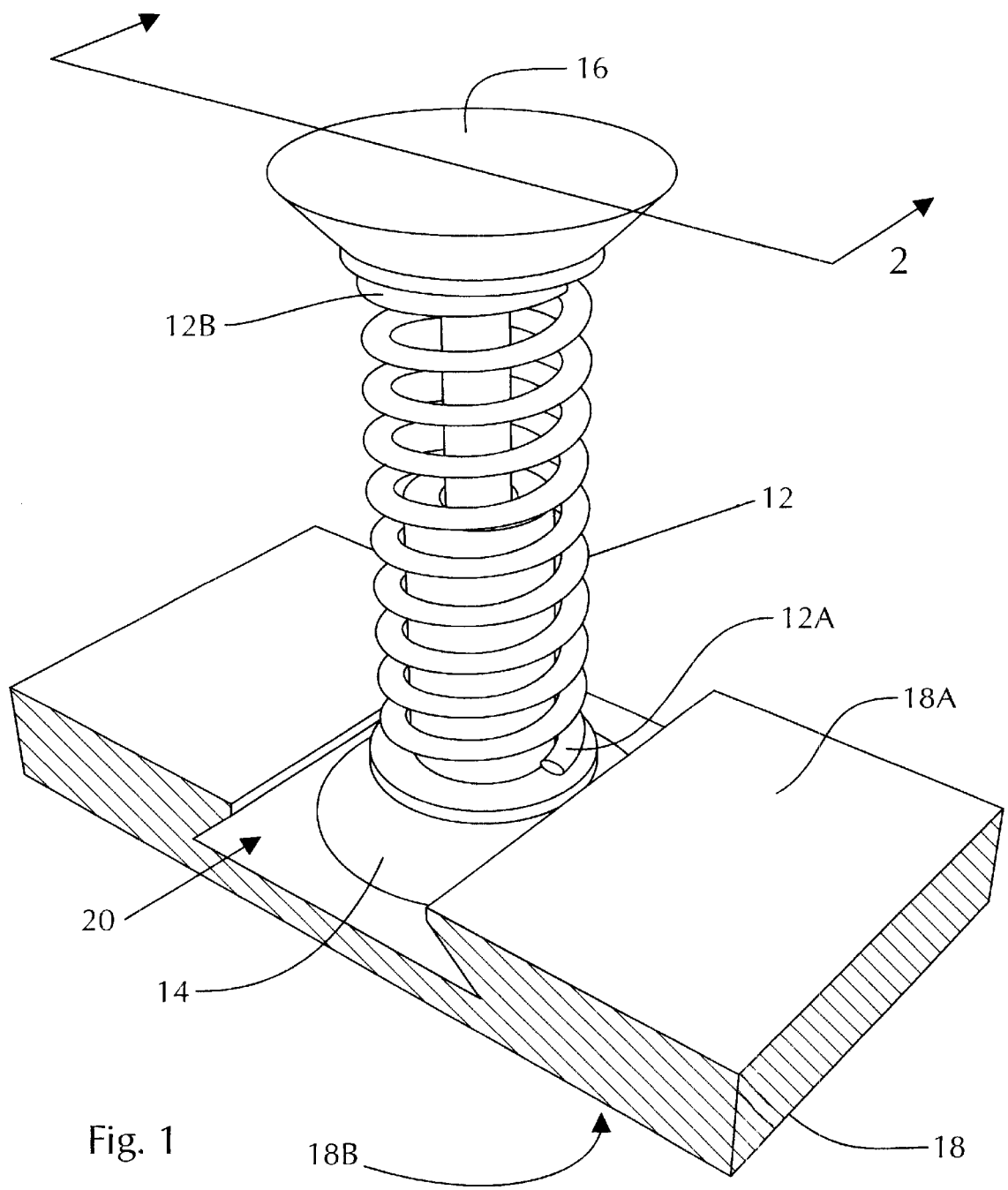
FIG. 1 is a front three-quarter perspective view of the spring mechanism of the present invention, illustrating the principal design in the preferred mode, including flared insert within female receiving member.
Figure 2:
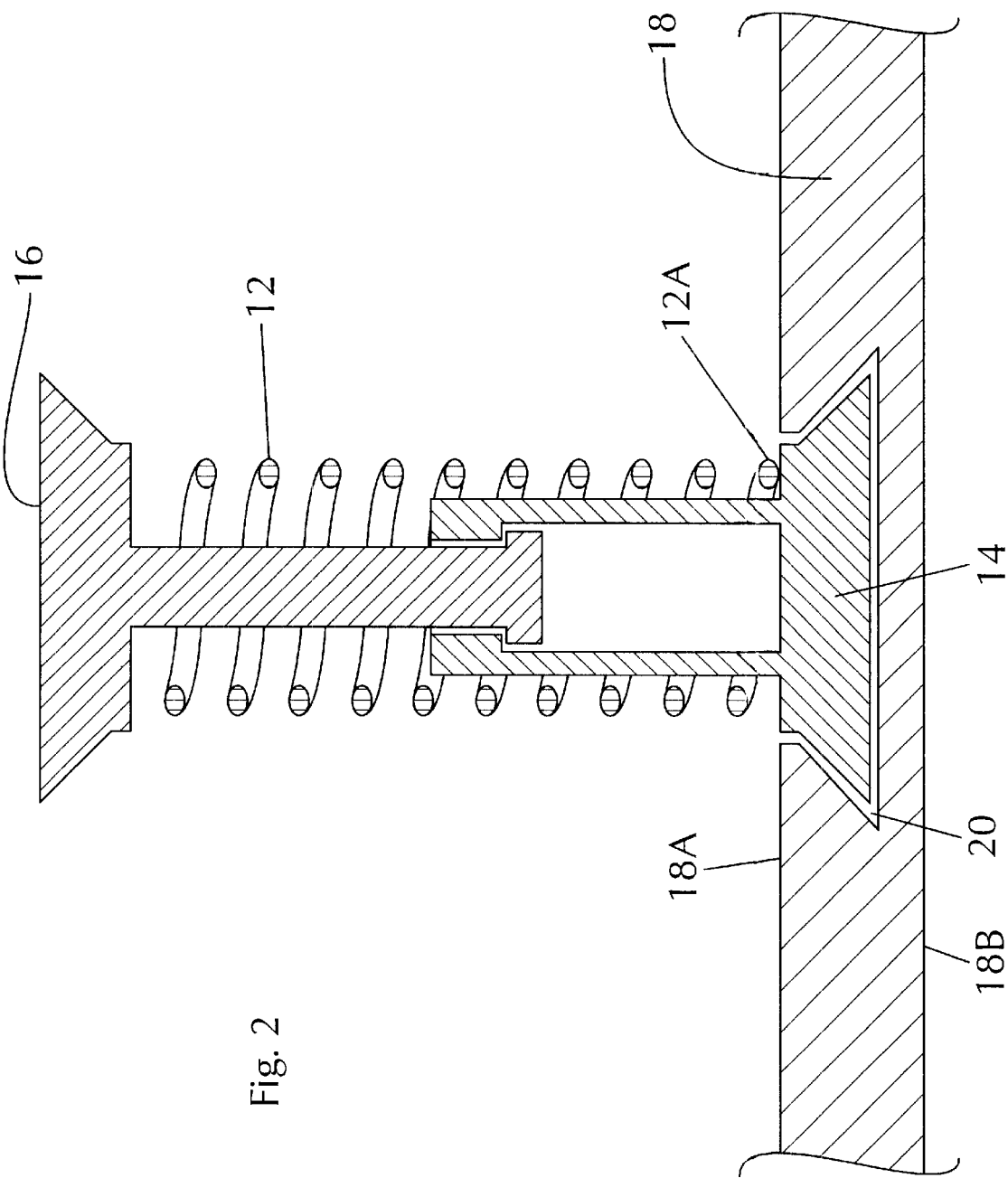
FIG. 2 is a cross-sectional view of the spring mechanism of the present invention along Line "2" of FIG. 1, also illustrating the principal design in the preferred mode, including flared insert within female receiving member.
Figure 3:
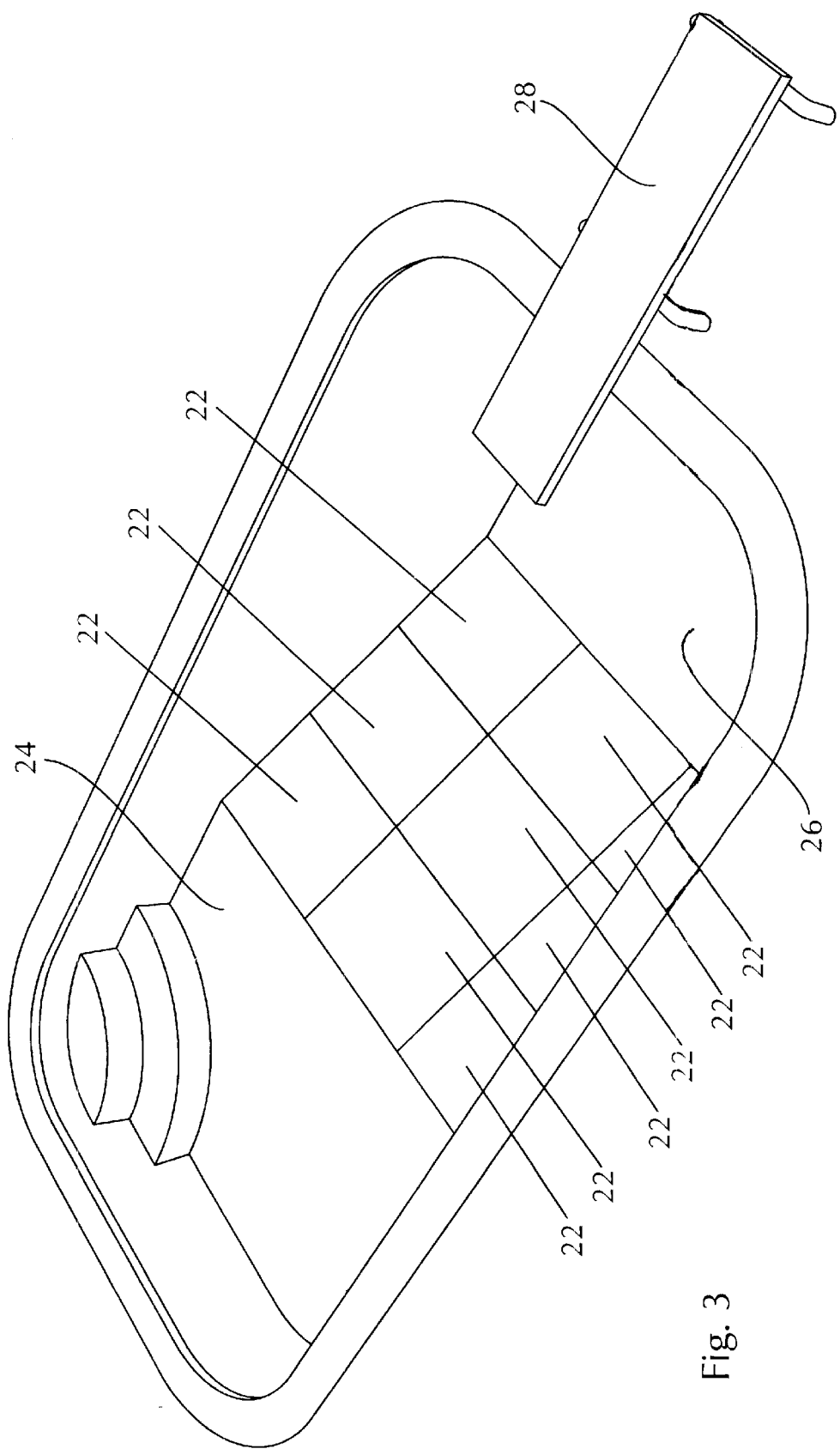
FIG. 3 is a front three-quarter perspective view of an in-ground style pool incorporating the spring assembly of the present invention, illustrating the spring assembly upon the bottom surface of the riser section of the pool, with the outermost panel (22) of the assembly covering the springs and forming the surface in which divers first come in contact.
Figure 4:
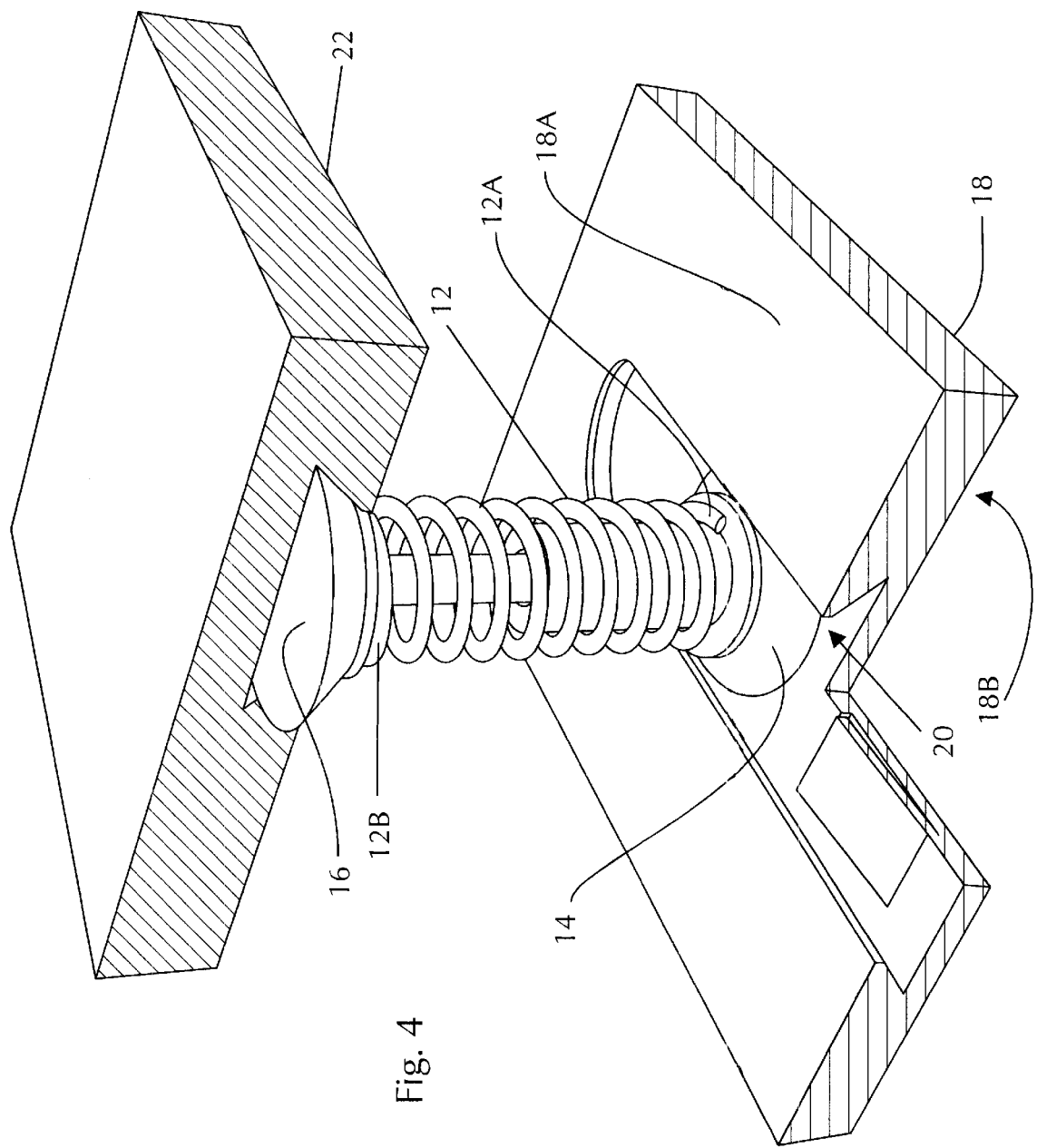
FIG. 4 is a front three-quarter perspective view of the spring mechanism of the present invention, illustrating the principal design as depicted in FIG. 1, depicting a simple locking mechanism for the purposes of example, and illustrating outer panel (22) as depicted in FIG. 3.

This description relates to the general comments above, as well as FIG. 1, which is a front three-quarter perspective view of the spring mechanism of the present invention, illustrating the principal design in the preferred mode, including flared insert within female receiving member; FIG. 2, which is a cross-sectional view of the spring mechanism of the present invention along Line "2" of FIG. 1, also illustrating the principal design in the prefer ed mode, including flared insert within female receiving member; FIG. 3, which is a front three-quarter perspective view of an in-ground style pool incorporating the spring assembly of the present invention, illustrating the spring assembly upon the bottom surface of the riser section of the pool, with the outermost panel of the assembly covering the springs and forming the surface in which divers first come in contact; and FIG. 4 is a front three-quarter perspective view of the spring mechanism of the present invention, illustrating the principal design as depicted in FIG. 1, depicting a simple locking mechanism for the purposes of example only, and illustrating upper panel (22) as depicted in FIG. 3.

In regards to all FIGURES, the spring assembly for usage in connection with floors, walls, crash mats and other flat surfaces comprises a previously-determined quantity of springs, such quantity selected according to the needs of any of a host of particular applications.

For example, differing numbers of springs may be utilized when the same are retrofitted to the floor of an in-ground pool or to the boards surrounding a hockey rink. As depicted in the FIGURES, each spring (12), comprises a spring first end (12A) or bottom portion, and a spring second end (12B) or upper portion.

Importantly, a first flared insert (14) is affixed to each spring (12) at the spring first end (12A), by a means selected according to ease of manufacture and general durability.

The flared insert (14) generally conical in configuration, tapered such that an outer edge of the first flared insert (14) is of a greater diameter than an inner edge of the first flared insert (14) which comes in contact with the spring first end (12A). Each such edge is generally cylindrical, forming a stable base for the flared insert member (14).

Likewise, a second flared insert (16) may be affixed to each spring (12) at the spring second end (12B). The second flared insert (16) is also generally conical in configuration, and also tapered such that an outer edge of the second flared insert (16) is of a greater diameter than an inner edge of the second flared insert (16) which comes in contact with the spring second end (12B). As is the case in the above description, each such edge is generally cylindrical, forming a stable base for the flared insert member (16).

Next, a receiving member (18) embodied within the flat surface in question itself comprises a top surface (18A), bottom surface (18B), and molded female slot (20). The molded female slot (20) is importantly in the form of a tapered, generally conical aperture, functioning to slidingly receive the first flared insert (14) therein.

The receiving member (18) is rigidly affixed to a previously-determined floors, walls, crash mats or other flat surface. The second flared insert (16) is also slidingly received by a solid member, which will form the outermost surface (22) in which direct forces come in contact. This configuration functions to allow the outermost panel (22) of the assembly to receive primary forces, with the coiled springs receiving secondary forces, the wall or floor receiving additional forces, and only remaining dissipated forces distributed to the body of one coming in contact therewith. As such, the outermost panel (22) is sufficiently durable to withstand such primary forces, as the assembly compresses in a unique manner to absorb the impact of humans coming in contact therewith.

In preferred modes of manufacture the spring members are produced in a thickness of a range of one-sixteenth inch to three-quarter inch. However, other thicknesses of springs may be utilized if desirable.

In all such cases, the springs are manufactured in a variety of previously-determined sizes, functioning to render the springs effective for multiple previously-determined sporting events and hazardous activities. Thus, the apparatus may be utilized for activities such as diving, swimming, ice hockey, roller hockey, roller skating, skateboarding, field hockey, soccer, lacrosse, football, arena football, gymnastics, baseball, auto racing, motorcycle racing, cycling, and track and field events.

Moreover, the springs may be manufactured in a variety of previously determined colors and designs. Thus, such will function to match a décor of a flat surface upon which the springs are utilized, rendering the same even more desirable to the industry in question.

In all embodiments, as noted, the springs attach to the flat surface without expensive modification thereto, and the assembly may be easily retrofitted to a host of previously-existing items.

It is imperative to note that the springs of the present invention may be tailored to absorb and dissipate foreseeable forces of humans and objects coming in contact with outer panel of the spring assembly and flat surface. As such, the coiled springs allow for far greater adaptability to particular needs than traditional pads constructed of foam and the like.

Regarding the precise construction of the present invention, the springs may manufactured of polymeric materials, such as a durable plastic to provide strength for the assembly at inexpensive cost of manufacture. Alternatively, the springs the springs may be manufactured of metal materials, such as steel, if desired by the manufacturer. Importantly, the spring could even be manufactured of titanium, providing durability at sharply reduced weight and costs.

In one embodiment, the flared insert of each spring is removably attached to the spring. However, in an alternate embodiment, the flared insert is rigidly attached to the spring to provide an even stronger assembly.

As noted above, the spring assembly may be retrofitted to previously-existing floors and flat surfaces, such as in previously-existing in-ground or above-ground pools. The assembly may be affixed to the pool floor via simple suction cups, and water will be allowed to easily pass therethrough. This will allow great numbers of persons to enjoy the benefits of the present invention at relatively low cost.

However, the spring assembly may also be manufactured in connection with new pools or wall surfaces, allowing for a highly convenient solution to problems existing in the prior art.

It is intended that the springs width be variable according to needs, such as of a width of a range of one-sixteenth inch to one half inch. Similarly, it is intended that the flared insert width be variable according to needs, such as of a range of one-quarter inch to three quarter inch.

Moreover, the spring assembly may be manufactured in a variety of previously-determined sizes, functioning to render the spring assembly effective for multiple previously determined sporting events and hazardous activities. In any such instance, the presence of the springs within the board or wall will significantly reduce the quantity of foam padding or board material needed, thus reducing weight and manufacturing costs.

In addition, the spring assembly may manufactured in a variety of previously-determined colors and designs, functioning to match a décor of the surfaces upon which the spring assembly is utilized. Furthermore, the spring assembly attaches to floors and boards without significant modification thereto.

Finally, it bears repeating that the springs described herein may be retrofitted to previously-existing floors, boards, or walls, or alternatively may be manufactured in connection with new items, providing the utmost in versatility to activities in need of additional protection.

With regards to all descriptions and graphics, while the invention has been illustrated and described as embodied, it is not intended to be limited to the detail shown, since it will be understood that various omissions, modifications, substitutions and changes in the forms and details of the device illustrated and in its operation can be made by those skilled in the art without departing in any way from the spirit of the invention.

Without further analysis, the foregoing will so fully reveal the gist of the present invention that others can readily adapt it for various applications without omitting features that, from the standpoint of prior art, constitute essential characteristics of the generic or specific aspects of this invention. What is claimed as new and desired to be protected by Letters Patent is set forth in the appended claims.

What is claimed is:

1. An impact and energy absorbing assembly for floors, walls, crash mats and other flat surfaces comprising:

a spring (12); which comprises a spring first end (12A) and spring second end (12B);

a first flared insert (14) affixed to spring (12) at the spring first end (12A), the flared insert (14) generally conical in configuration, tapered such that an outer edge of the first flared insert (14) is of a greater diameter than an inner edge of the first flared insert (14) which comes in contact with the spring first end (12A);

a second flared insert (46) affixed to spring (12) at the spring second end (12B), the flared insert (16) generally conical in configuration, tapered such that an outer edge of the second flared insert (16) is of a greater diameter than an inner edge of the second flared insert (16) which comes in contact with the spring second end (12B);

a receiving member (18), comprising a top surface (18A), bottom surface (18B), and molded female slot (20), molded female slot (20) in the form of a tapered, generally conical aperture, functioning to slidingly receive first flared insert (14) therein, receiving member (18) rigidly affixed to a previously determined flat surface; and an outermost panel (22) which covers the plurality of springs of the assembly, the outermost panel exposed and functioning to receive primary forces of humans and object coming in contact therewith, with the plurality of springs receiving secondary forces, the flat surface receiving additional forces, and only remaining dissipated forces distributed to the body of one coming in contact with the outermost panel (22).

2. The impact and energy absorbing assembly for floors, walls, and other flat surfaces as described in claim 1, wherein the spring assembly is used in connection with a floor of an in-ground style swimming pool.

3. The impact and energy absorbing assembly for floors, walls, and other flat surfaces as described in claim 2, wherein the spring assembly is adapted to a riser portion of a floor of a swimming pool, adjacent a diving board used in connection therewith.

4. The impact and energy absorbing assembly for floors, walls, and other flat surfaces as described in claim 1, wherein the spring assembly is used in connection with a floor of an above-ground style swimming pool.

5. The impact and energy absorbing assembly for floors, walls, and other flat surfaces as described in claim 1, wherein the spring assembly is adapted to a floor of a swimming pool by a plurality of suction cups, wherein water is allowed to pass through the assembly.

6. The impact and energy absorbing assembly for floors, walls, and other flat surfaces as described in claim 1, wherein the presence of springs within the assembly significantly reduces a quantity of padding and board material needed, thus reducing weight and manufacturing costs.

7. The impact and energy absorbing assembly for floors, walls, and other flat surfaces as described in claim 1, wherein the assembly is used in conjunction with previously existing boards of indoor sporting arenas.

8. The impact and energy absorbing assembly for floors, walls, and other flat surfaces as described in claim 1, wherein the assembly is used for an activity selected from the group consisting of diving, swimming, ice hockey, roller hockey, roller skating, skateboarding, field hockey, soccer, lacrosse; football, arena football, gymnastics, baseball, auto racing, motorcycle racing, cycling, and track and field events.

9. The impact and energy absorbing assembly for floors, walls, and other flat surfaces as described in claim 1, wherein each spring is tailored to absorb and dissipate foreseeable forces of humans and objects coming in contact with the spring assembly.

10. The impact and energy absorbing assembly for floors, walls, and other flat surfaces as described in claim 1, wherein the springs are manufactured of polymeric materials.

11. The impact and energy absorbing assembly for floors, walls, and other flat surfaces as described in claim 1, wherein the springs are manufactured of metal materials, including steel and titanium.

12. The impact and energy absorbing assembly for floors, walls, and other flat surfaces as described in claim 1, wherein the flared insert is removably attached to the spring.

13. The impact and energy absorbing assembly for floors, walls, and other flat surfaces as described in claim 1, wherein the flared insert is rigidly attached to the spring.

14. The impact and energy absorbing assembly for floors, walls, and other flat surfaces as described in claim 1, wherein the spring assembly is retrofitted to previously-existing floors, walls, and other flat surfaces.

15. The impact and energy absorbing assembly for floors, walls, and other flat surfaces as described in claim 1, wherein the spring is of a width of a range of one sixteenth inch to one half inch.

16. The impact and energy absorbing assembly for floors, walls, and other flat surfaces as described in claim 1, wherein the flared insert is of a width of a range of one-quarter inch to three quarter inch.

17. The impact and energy absorbing assembly for floors, walls, and other flat surfaces as described in claim 1, wherein the spring assembly is manufactured in a variety of previously determined sizes, functioning to render the spring assembly effective for multiple previously determined sporting events and hazardous activities.

18. The impact and energy absorbing assembly for floors, walls, and other flat surfaces as described in claim 1, wherein the spring assembly is manufactured in a variety of previously determined colors and designs, functioning to match a décor of flat surfaces upon which the spring assembly is utilized.

19. The impact and energy absorbing assembly for floors, walls, and other flat surfaces as described in claim 1, wherein the spring assembly attaches to the flat surface without significant modification to the flat surface.

\* \* \* \* \*